United States Patent [19]

Kimura

[11] Patent Number: 4,686,545
[45] Date of Patent: Aug. 11, 1987

[54] LASER RECORDING APPARATUS
[75] Inventor: Shigeki Kimura, Osaka, Japan
[73] Assignee: Mita Industries, Co., Ltd., Japan
[21] Appl. No.: 848,338
[22] Filed: Apr. 4, 1986

Related U.S. Application Data

[63] Continuation of Ser. No. 542,449, Oct. 17, 1983, abandoned.

[30] Foreign Application Priority Data

Oct. 18, 1982 [JP] Japan ................................. 57-182572

[51] Int. Cl.⁴ ........................................... G01D 15/14
[52] U.S. Cl. ..................................... 346/160; 346/154
[58] Field of Search ...................... 346/76 L, 108, 154,
346/160; 364/519; 358/298, 300-302; 400/119;
101/DIG. 13

[56] References Cited

U.S. PATENT DOCUMENTS 4,175,851 11/1979 Kitamura et al. ................. 355/14 R
4,316,199 2/1982 Greenig et al. ...................... 346/160

OTHER PUBLICATIONS

Kosel, "The Overprinting Process of the 3352 Laser Printer", Siemens Review, XLV (1978) No. 7, Jul., pp 331-333.
Findley et al, "Control of the IBM 3800 Printing System", IBM J. Res. Develop., vol. 22, No. 1, Jan. 78, pp. 2-12.
Yamamoto, "Laser Beam Printers Use Xerography", JEE, vol. 16, No. 152, Aug. '79, pp. 49-51.
"Memory Access Technique", Ward, IBM Tech. Disclosure, vol. 21, No. 3, pp. 992-994, Aug. 78.
"Multiply Character Set Printer", Kennedy et al, IBM Tech. Disclosure, vol. 24, No. 4, pp. 2070-2073, Sep. 81.

Primary Examiner—Arthur G. Evans
Attorney, Agent, or Firm—Finnegan, Henderson, Farabow, Garrett and Dunner

[57] ABSTRACT

A laser recording apparatus has an image control circuit which allows for vertical or horizontal straight lines to be printed in spaces between lines without increasing the capacity of the memory region of the memory means of the apparatus. The image control circuit includes memory for storing character data, character patterning circuitry for converting the character data into character patterns which have memory regions for storing character data, control circuitry for reading character data stored in the peripheral portions of the memory regions to read such character data as straight lines in the spaces between character patterns and a central processing unit to control the various circuitry.

9 Claims, 14 Drawing Figures

NORMAL

UNDER

SUPER

SUB

LASER RECORDING APPARATUS

This application is a continuation of application Ser. No. 542,449, filed Oct. 17, 1983, abandoned.

BACKGROUND OF THE INVENTION

This invention relates to a laser recording apparatus in which character data are applied through an image control circuit to a printer mechanism for printing.

In printing character patterns such as numerals and characters with a conventional laser recording apparatus, character data are sequentially read out of the memory means, and after characters for one line have been printed, the laser beam is idly scanned by a signal from the control means for providing a space between the lines, so that characters for the following line are printed. Nothing is printed in the space between the lines. Accordingly, for instance in forming a table, lines to be drawn vertically are not printed. This difficulty has been eliminated by expanding the character pattern memory region to the space thereby to eliminate the idle scanning of the laser beam. However, this method has the disadvantage that the memory means for storing character data needs a large capacity memory region.

SUMMARY OF THE INVENTION

Accordingly, an object of this invention is to provide a laser recording apparatus in which the above-described drawback accompanying a conventional laser recording apparatus has been eliminated so that it is unnecessary to increase the capacity of the memory region of the memory means where character data are stored, and yet vertical or horizontal straight lines can be printed in the spaces between the lines.

The laser recording apparatus of this invention in which character data are applied through an image control circuit to a printer mechanism is characterized by the image control circuit which comprises memory means for storing character data, character-patterning means for converting the character data into character patterns which have memory regions for storing character data, control means for reading character data stored in the peripheral portions of the memory regions to read such character data as straight lines in the spaces between character patterns, and a central processing unit for controlling the above means.

DESCRIPTION OF THE PREFERRED EMBODIMENT

Figure 1:
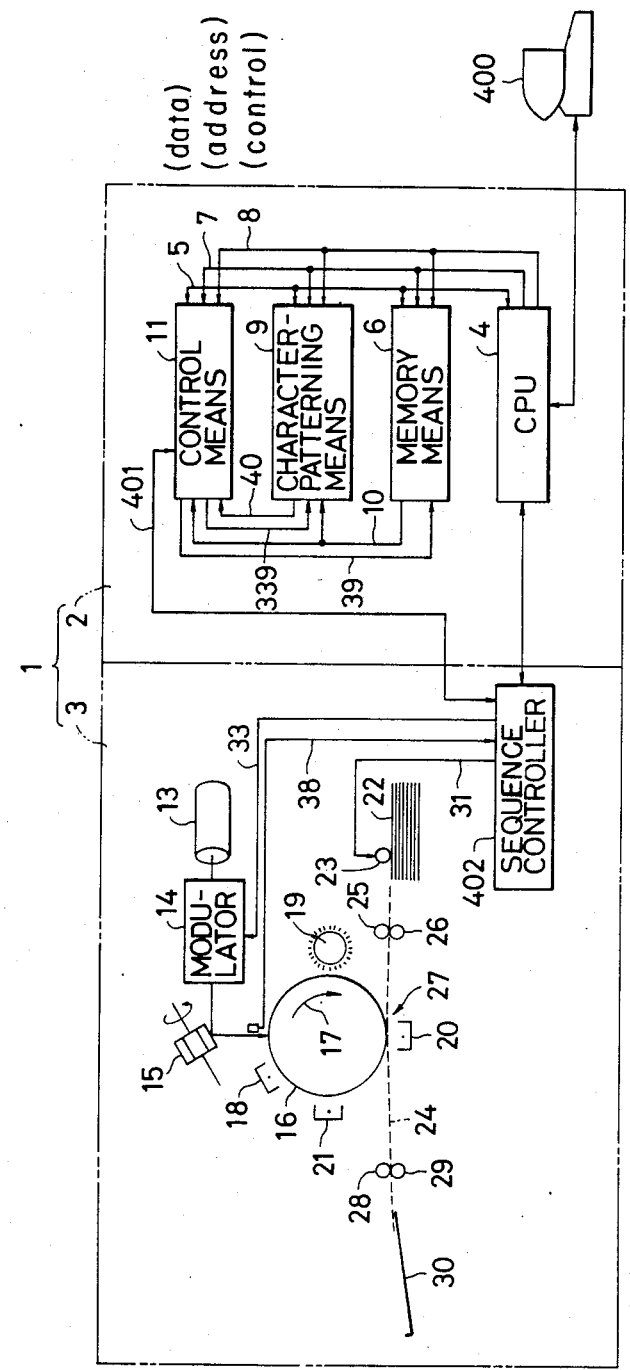
FIG. 1 is a block diagram of a preferred embodiment of the invention.

One preferred embodiment of this invention will be described with reference to the accompanying drawings. FIG. 1 shows a block diagram of the laser recording apparatus of this invention. A laser recording apparatus 1 includes: an image control circuit 2 and a printer mechanism 3 operating on signals from the image control circuit 2. The image control circuit 2 has a central processing unit 4 connected to a host computer 400, memory means 6, character-patterning means 9 and control means 11. The memory means 6 operates to store character data to be printed. For this purpose, the memory means 6 receives character data signals from the central processing unit 4 through a data bus 5, address signals for specifying memory regions in the memory means 6 through an address bus 7, and control signals through a control bus 8.

The character-patterning means 9 operates to convert the character data, which have been coded and stored in memory means 6, into character patterns. For this purpose, the character-patterning means 9 receives signals through the data bus 5 and the address bus 7 from the central processing unit 4. In addition, the character-patterning means 9 receives signals through a bus 10 from the memory means 6 and signals through a bus 339 from the control means 11.

In order to control the laser beam of the printer mechanism 3, the control means 11 applies a signal through a bus 401 and a sequence controller 402 to a modulator 14. For this purpose, the control means 11 receives signals through the buses 5, 7 and 8 from the central processing unit 4, signals through the bus 10 from the memory means 6, and signals through a bus 40 from the character-patterning means 9.

In the printer mechanism 3, a laser beam generated by a laser oscillator 13 is modulated by modulator 14 and is then applied through a rotary multi-mirror 15 to a photosensitive member 16. The modulator 14 receives signals from control means 11 in the image control circuit 2 through the sequence controller 402, as described above. The photosensitive member 16 is manufactured by forming a photosensitive layer on the cylindrical wall of a rotary drum.

A charging corona discharger 18, a magnetic brush developing unit 19, a transferring corona discharger 20 and a discharging unit 21 are arranged around the photosensitive member 16 in the stated order in the direction of rotation 17. A copying sheet 22 is supplied from a sheet supplying roller 23 and conveyed along a guide path 24 indicated by the broken line. A pair of conveying rollers 25 and 26 are provided in the guide path 24 to deliver the copying sheet to a transferring region 27. In the region 27, the copying sheet 22 is brought into close contact with the photosensitive member 16. Thereafter, the copying sheet 22 is discharged into a tray by means of a pair of fixing rollers 28 and 29.

The photosensitive member 16 is charged by the charging corona discharger 18 and is then irradiated by the laser beam, so that an electrostatic latent image is formed thereon. The latent image thus formed is developed by the magnetic brush developing unit 19. The image thus developed on the photosensitive member 16 is transferred onto the copying sheet 22 in the transferring region. The image thus transferred is fixed by the pair of fixing followers 28 and 29. The copying sheet 22, on which the character data have been printed as described above, is delivered into the tray 30. The sheet supplying roller 23 operates on the control signal which is applied thereto through the sequence controller 402 from the central processing unit 4, so that the copying sheet 22 is supplied in synchronization with the formation of an image on the photosensitive member 16.

Figure 2:
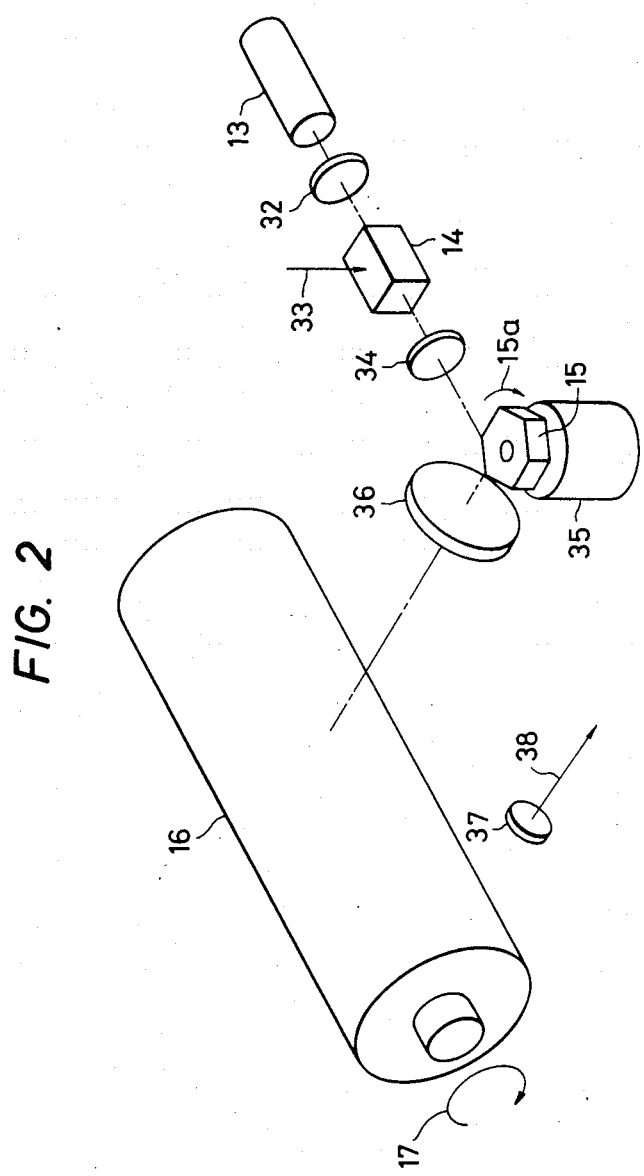
FIG. 2 is a perspective view showing the optical path of the laser beam of FIG. 1 in detail.

FIG. 2 is a perspective view showing the optical path of the laser beam in FIG. 1 in detail. The optical path will be described with reference to FIG. 1 also. The laser beam from the laser oscillator 13 is applied to the modulator 14, after being reduced in diameter by a lens 32. A control signal is applied from the control means 11 in the image control circuit 2 through the sequence controller 402 and the line 33 to the modulator 14. The laser beam modulated with the control signal in the modulator 14 is restored in diameter by lens 34, reflected by the rotary multi-mirror 15, and applied to the photosensitive member 16. The rotary multi-mirror 15 is rotated by a motor 35 for instance at 14,000 rpm in the direction of the arrow 15a. An image forming lens 36, namely, an "f-θ lens" is arranged between the rotary multi-mirror 15 and the photosensitive member 16, so as to cause the laser beam to scan horizontally the photosensitive member 16 at a constant speed. A laser beam detector 37 is disposed near one end of the photosensitive member 16. The detector 37 provides a laser beam detection signal which is applied through the line 38 and the sequence controller 402 to the central processing unit 4.

Figure 3:
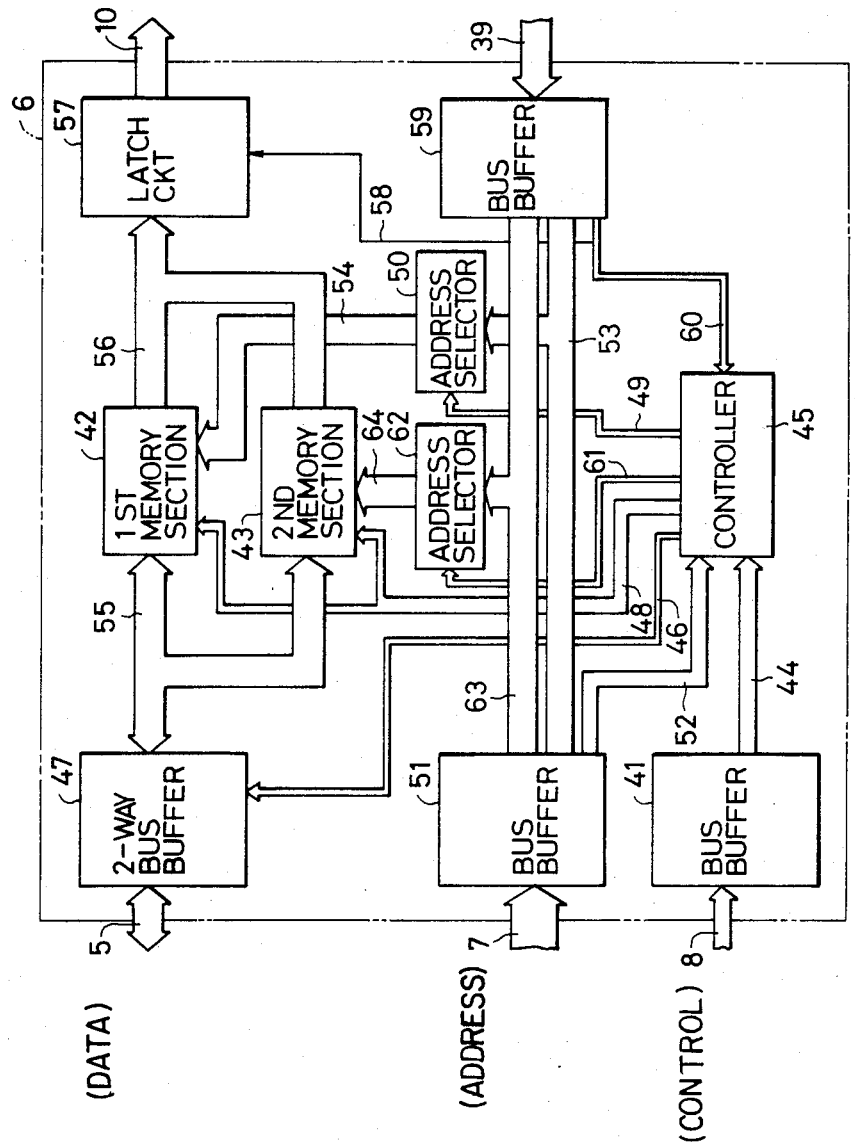
FIG. 3 is a block diagram showing the memory means of FIG. 1 in detail.

FIG. 3 is a block diagram showing the memory means 6 of FIG. 1 in detail. In the memory means 6, a signal for specifying a first memory section 42 or a second memory section 43 is applied from the central processing unit 4 through the control bus 8 to a bus buffer 41. This signal is applied from the bus buffer 41 through a bus 44 to a controller 45. When the signal specifies the first memory section 42, the controller 45 applies a signal through a bus 46 to a two-way bus buffer 47, a signal through a bus 48 to the first memory section 42 and a signal through a bus 49 to an address selector 50, so that character data can be stored in the first memory section 42. A signal for specifying an address in the memory region of the first memory section 42 is applied from the central processing unit 4 through the address bus 7 to the bus buffer 51. This signal is applied from the bus buffer 51 through a bus 52 to the controller 45 and through a bus 53 to the address selector 50. The address selector 50 applies a signal for specifying an address in the memory region of the first memory section 42 through the bus 54. As a result, the two-way bus buffer 47 receives a character data signal through the data bus 5 from the central processing unit 4. The character data signal thus received is applied through bus 55 to the first memory section 42, where it is stored in the specified address. Thus, the character data for the first page of the copying sheet 22 have been stored in the first memory section 42.

When the first memory section 42 is selected by a signal applied through a bus 60 and a memory address is specified with the aid of the bus 53, address selector 50 and bus 54, the character data signal for the first page is inputted into a latch circuit 57 having a buffer function through a bus 56 from the first memory section 42, so that it is temporarily stored in the latch circuit 57. The latch circuit 57 receives a control signal through a line 58 from a bus buffer 59, so as to apply the temporarily stored character data signal through a bus 10 to a bus buffer 116 in the control means 11 (described later).

While the character data signal is inputted into the latch circuit 57 through the bus 56 from the first memory section 42, a character data signal for the second page is applied from the central processing unit 4 through the bus 55 to the second memory section 43. For this purpose, a signal for specifying the second memory section 43 is applied to the bus buffer through the control bus 8, and a signal for specifying an address in the memory region of the second memory section 43 is applied to the bus buffer 51 through the address bus 7. The signal applied to the bus buffer 51 is applied through the bus 52 to the controller 45 and through a bus 63 to address selector 62. A signal from the bus buffer 41 is applied through the bus 44 to the controller 45, so that the controller 45 applies signals through the bus 46 to the two-way bus buffer 47, through the bus 48 to the second memory section 43. Thus, the character data for the second page of the copying sheet are stored in the specified address in the memory region of the second memory section 43.

Figure 4:
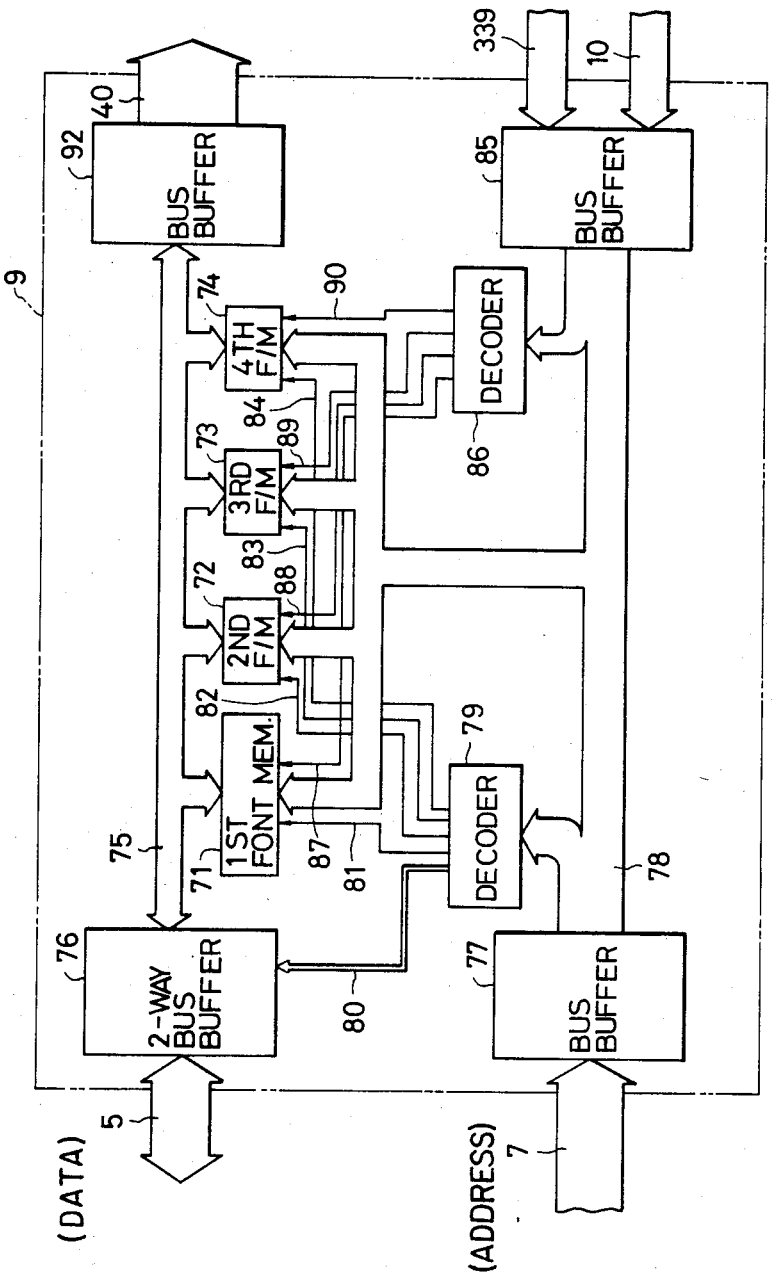
FIG. 4 is a block diagram showing the character-patterning means of FIG. 1 in detail.

FIG. 4 is a block diagram showing the character-patterning means 9 of FIG. 1 in detail. The character-patterning means 9 includes first, second, third and fourth font memories 71, 72, 73 and 74 for storing the configuration of a character pattern which are to be printed by the printer mechanism 3. These first through fourth font memories 71 through 74 may be replaced by one, two or three font memories which are larger in capacity. A two-way bus buffer 76 is connected through the data bus 5 to the central processing unit 4. The central processing unit 4 applies signals for specifying addresses in the memory regions of the first through fourth font memories 71 through 74 through the address bus 7 to a bus buffer 77. The address specifying signals read by the bus buffer 77 are applied through a bus 78 to a decoder 79 and to the first through fourth font memories 71 through 74. The decoder 79 applies signals for selecting the first through fourth font memories 71 through 74, respectively, to lines 81 through 84. In practice, one of the first through fourth font memories 71 through 74 is selected. An address in the memory region of the font memory thus selected is specified through the bus 78, so that a character pattern from the central processing unit 4 can be read and written.

A character data signal code is applied from the above-described latch circuit 57 through the bus 10 to a bus buffer 85, while a line signal (described later) is applied from the control means 11 to the bus buffer 85 through a bus 339. The character data and line signal are applied from the bus buffer 85 through the bus 78 to a decoder 86 and the first through fourth font memories 71 through 74. Signals for selecting the first through fourth font memories 71 through 74 are applied from the decoder 86 through lines 87 through 90 to these font memories 71 through 74, respectively. The character pattern, which has been stored in the first through fourth font memories 71 through 74, is applied through the bus 75 to a bus buffer 92. The character pattern signal is applied from the bus buffer 92 through the bus 40 to the control means 11.

Figure 5:
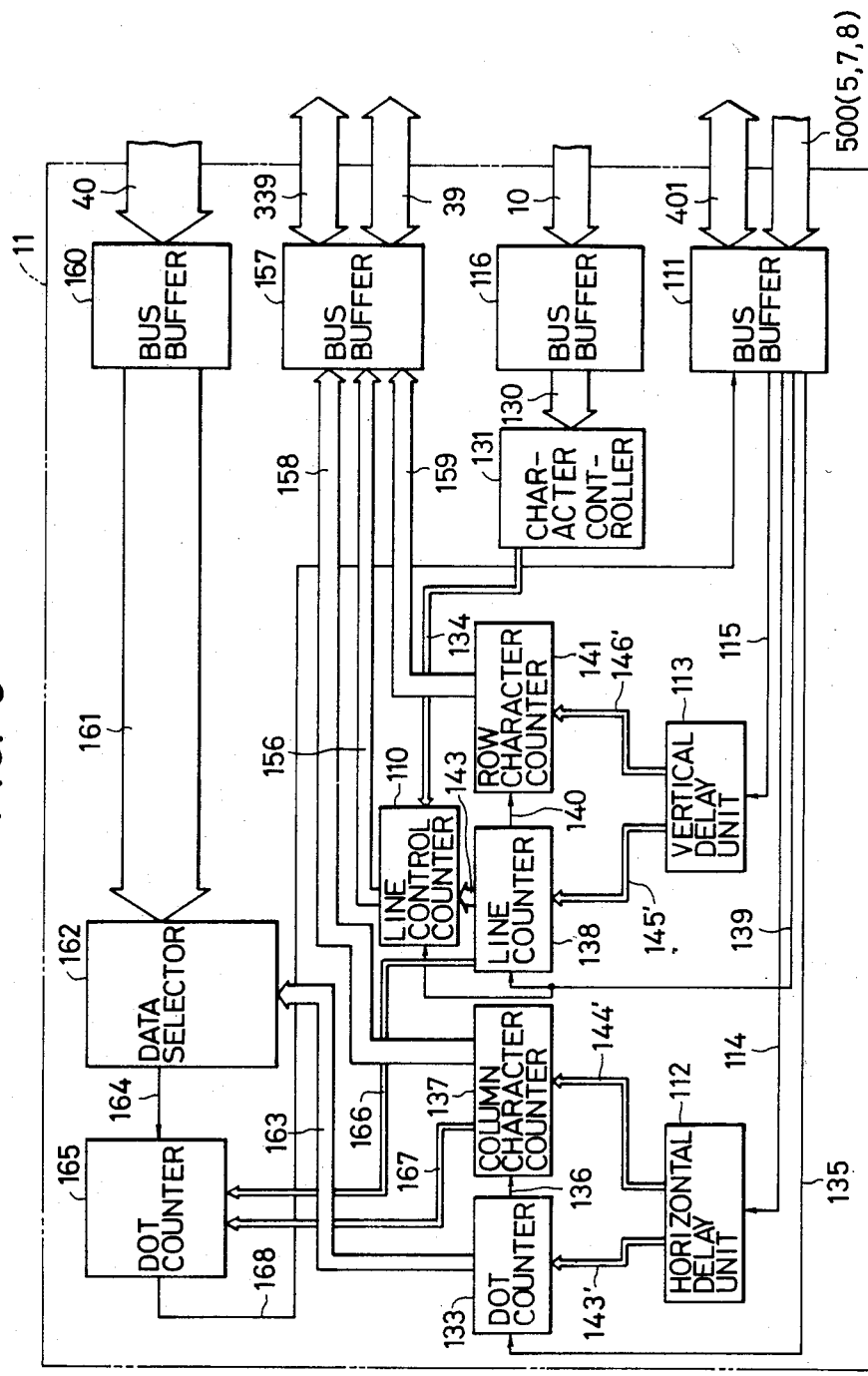
FIG. 5 is a block diagram showing the control means of FIG. 1 in detail.
Figure 6:
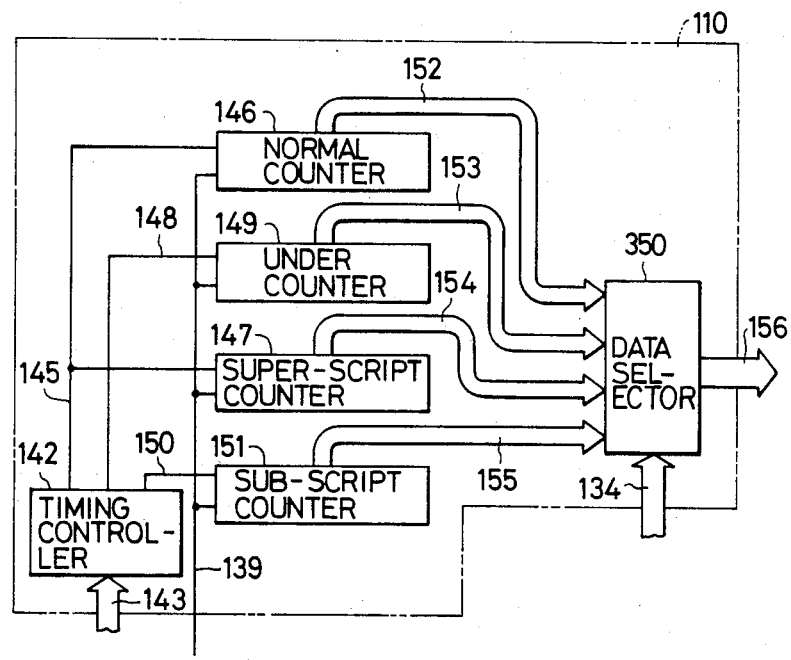
FIG. 6 is a block diagram showing a line control counter of FIG. 5 in detail.

FIG. 5 is a block diagram showing the control means 11 of FIG. 1 in detail, and FIG. 6 is a block diagram illustrating the line control counter 110 of FIG. 5 in detail. A signal corresponding to a laser beam detection is applied from the sequence controller 402 in the printer mechanism 3 through a bus 401 to a bus buffer 111. A pulse signal corresponding to dots is applied from the central processing unit 4 through a bus 500 including the buses 5, 7 and 8 to the bus buffer 111. A signal is applied from the central processing unit 4 through the sequence controller 402 and the line 31 to the sheet supplying roller 23.

The bus buffer 111 applies signals through lines 114 and 115 to a horizontal delay unit 112 and a vertical delay unit 113 respectively. The horizontal delay unit 112 operates to determine a print start point on the copying region of a copying sheet in a horizontal direction, while the vertical delay unit 113 operates to determine a print start point on the copying region in a vertical direction. The former print start point is determined according to the laser beam detection of the detector 37, while the latter print start point is determined according to the copying sheet detection output of a sensor (not shown) provided in the copying sheet conveying path. Thus, the position of the copying sheet to be copied has been determined.

Signals provided respectively for characters are applied from the memory region (where character data are stored) of the first or second memory section 42 or 43 in the above-described memory means 6 to a bus buffer 116 in the control means 11.

Figure 7A:
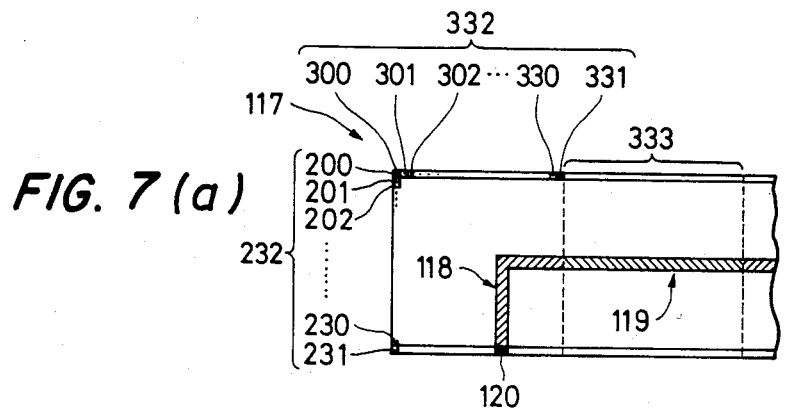
FIG. 7 is a diagram showing the memory contents of the character-patterning means for a description of the operation of the control means shown in FIG. 5.
Figure 7B:
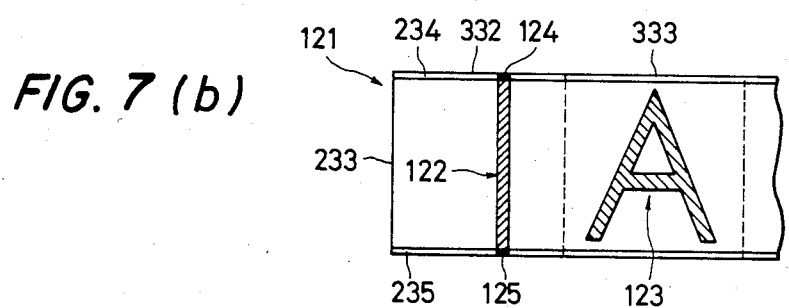
Figure 7C:
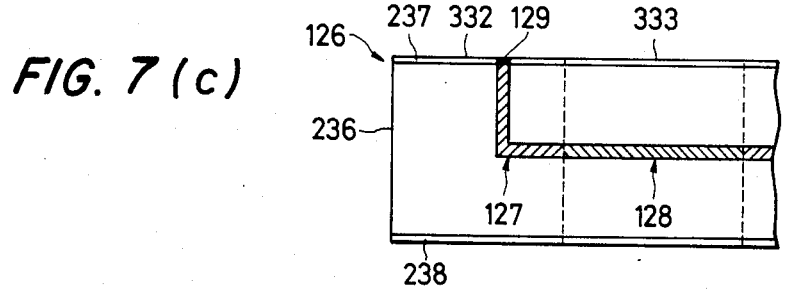
Figure 8A:
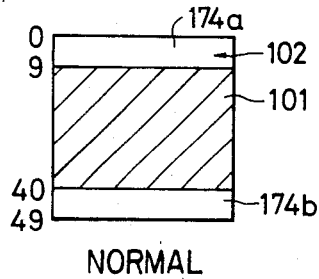
FIGS. 8(a)-(d) are diagrams which show the indicating region of a copying sheet.
Figure 8B:
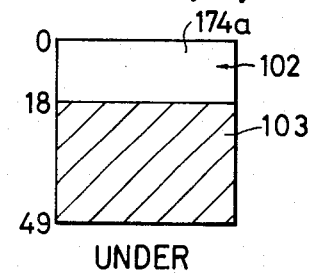
Figure 8C:
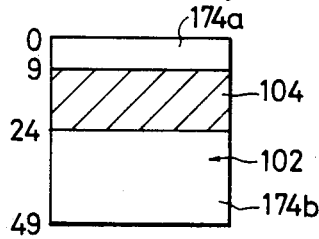
Figure 8D:
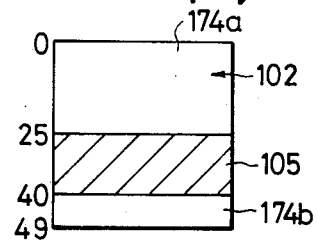

FIG. 7 is a diagram for a description of the operation of the control means 11. Part (a) of FIG. 7 shows a character pattern in the 0-th row 232 in a region 117 in the character-patterning means 9. In the memory region 117, the first character pattern 118 is formed by the 0-th row 232 including thirty-two lines, i.e., the 0-th line 200, the first line 201, the second line 202, . . . , the thirtieth line 230 and the thirty-first line 231, in a vertical direction, and the 0-th column 332 including thirty-two dots, i.e., the 0-th dot 300, the first dot 301, the second dot 302, . . . , the thirtieth dot 330 and the thirty-first dot 331, in a horizontal direction.

In the memory region 117, the second character pattern 119 is formed by the first column 333 on the right-hand side of the 0-th column 332, and the 0-th row 232. The first character pattern is like an inverted-L, and the second character pattern is like a straight line "_". A pattern 120 to be printed repeatedly in the above-described space is indicated in black on the lowermost line 231 in the memory region 117.

Part (b) of FIG. 7 shows a character pattern in the first row 233. In a memory region 121, the first character pattern 122 is I-shaped, and the second character pattern is the character "A". Patterns 124 and 125 to be printed repeatedly in the above-described space are indicated in black on the uppermost and lowermost lines of the memory region 121, namely, the 0-th line 234 and the thirty-second line 235.

Part (c) of FIG. 7 shows a character pattern in the second row 236. In a memory region 126, the first character pattern 127 is substantially L-shaped, and the second character pattern 128 is like a straight line "_". A pattern 129 to be printed repeatedly in the aforementioned space is indicated in black on the uppermost line of the memory region 126, namely, the 0-th line 237.

Referring to FIGS. 1, 5, 6 and 7, the character data in part (a) of FIG. 7 applied to the bus buffer 116 is applied through bus 130 to a character controller 131. The character controller 131 applies a signal through a bus 134 to a data selector 350 in a line control counter 110, to select a normal counter 146, an under counter 149, a super-script counter 147 or a sub-script counter 151.

A clock signal is applied from the bus buffer 111 through a line 135 to a dot counter 133, and it is further applied through a line 136 to a column character counter 137. Control signals are applied from the above-described horizontal delay unit 112 through buses 143' and 144' to the dot counter 133 and the column character counter 137, respectively, so that the contents of the counters 133 and 137 are reset to an initial value, zero. The dot counter 133 counts the 0-th dot 300 through the thirty-first dot 331 of the 0-th column 332 in the 0-th line 200 of the 0-th row as shown in the part (a) of FIG. 7, whereby a signal is applied through a line 136 to the column character counter 137 to cause the latter to count "1". As a result, the dot counter 133 counts the 0-th through 31st dots of the first column 333.

A clock signal is applied from the bus buffer 111 through a line 139 to a line counter 138 for every scanning of the laser beam, and it is further applied through a line 140 to a row character counter 141. Control signals are applied from the vertical delay unit 113 through buses 145' and 146' to the line counter 138 and the row character counter 141, respectively, so that the contents of the counters 138 and 141 are reset to an initial value zero. The line counter 138 counts the 0-th through 31st lines as a result of which the row character counter 141 counts "1". Then, the line counter 138 counts the lines. Thus, character data addresses are counted according to data from the column character counter 137 and the row character counter 141.

Referring to FIG. 6, a control signal from the line counter 138 is applied through a bus 143 to a timing controller 142 in the line control counter 110. The timing controller 142 is connected through a line 145 to the normal counter 146 and the super-script counter 147, through a line 148 to the under counter 149, and through a line 150 to the sub-script counter 151. Accordingly, when the timing controller 142 applies control signals to the lines 145, 148 and 150, these counters 146, 149, 147 and 151 are enabled to count addresses. A clock signal similar to that which is applied to the line counter 138 is applied through a line 139 to the counters 146, 149, 147 and 151.

When an input signal applied through the line 139 to the normal counter 146 is ranged from "0" to "8", the counter 146 provides an output signal "0"; when input signals "9" through "40" are applied to the counter 146, the latter provides output signals "0" through "31", respectively; and when input signals "41" through "49" are applied to the counter 146, the latter 146 provides an output signal "31". These output signals are applied to the data selector 350 through a bus 152. Accordingly, when the input signals "0" through "8" are applied, signals corresponding to the 0-th lines 200, 234 and 237 shown in the parts (a), (b) and (c) of FIG. 7 are repeatedly outputted; when the input signals are "9" through "40", signals corresponding to the 0-th through 31st lines are outputted; and when the input signals are "41" through "49", a signal corresponding to the 31st line is outputted. Accordingly, in an indicating region 102 of a copying sheet 22, as shown in the part (a) of FIG. 8, the 0-th lines 200, 234 and 237 and the 31st lines 231, 235 and 238 are repeatedly indicated in region parts 174a and 174b, and characters on the 0-th through 31st lines are indicated in a region part 101 shaded with oblique lines.

when an input signal applied to the under counter 149 is ranged from "0" to "17", the counter 149 provides an output signal "0"; and when input signals "18" through "49" are applied, the counter 149 provides output signals "0" through "31". These output signals are applied through a bus 153 to the data selector 350. With the output signals of the under counter 149, as shown in part (b) of FIG. 8, characters on the 0-th lines are repeatedly indicated in a region part 174a of an indicating region 102 of a copying sheet 22 and a character on the 0-th through 31st lines is indicated in a region part 103 shaded with oblique lines.

When an input signal applied through a line 139 to the super-script counter 147 is ranged from "0" to "8", the counter 147 provides an output signal "0"; when input signals "9" through "24" are applied, the counter provides output signals "0", "2", "4", "6", "8", ... and "30"; and when input signals "25" through "49" are applied, the counter provides an output signal "31". These output signals are applied through a bus 154 to the data selector 350. With the output signals of the superscript counter 147, as shown in part (c) of FIG. 8, characters on the 0-th and 31st lines are repeatedly indicated in region parts 174a and 174b of an indicating region 102 of a copying sheet 22, and characters on the 2nd, 4th, 6th, 8th, ... and 30th lines are indicated in a region part 104.

When an input signal applied through a line 139 to the sub-script counter 151 is ranged from "0" to "24", the counter 151 provides an output signal "0"; when input signals "25" through "40" are applied, the counter provides output signals "0", "2", "4", "6", "8", ... and "30", respectively: and when input signals "41" through "49" are applied, the counter provides an output signal "31". These output signals are applied through the bus 155 to the data selector 350. With these output signals of the sub-script counter 151, as shown in the part (d) of FIG. 8, characters on the 0-th and 31st lines are repeatedly indicated in region parts 174a and 174b of an indicating region 102 of a copying sheet 22, and characters on the 2nd, 4th, 6th, 8th, ... and 30th lines are indicated in a region part 105.

The output signal of the data selector 350 in the line control counter 110 is applied through a bus 156 to a bus buffer 157. A signal from the column character counter 137 is applied through a bus 158 to the bus buffer 157, and a signal from the row character counter 141 is applied through a bus 159 to the bus buffer 157.

Accordingly, the address signals of the character data which have been stored in the memory regions of the first and second memory sections 42 and 43 in the memory means 6 are sequentially applied to the bus buffer 157, so as to be supplied through a bus 39 to the memory means 6. Line signals are applied through the bus 39 to the character-patterning means 9. By these mechanisms, the data which have been stored in the first memory section 42 in the memory means 6 are inputted to the character-patterning means 9 according to the address signals which are provided through the bus 39 by the control means 11. The data thus inputted are applied through the bus 56, the latch circuit 57 and the bus 10 to the bus buffer 85, while line signals for specifying lines are applied through the bus 399 to the bus buffer 85. As a result, the pattern data of each line are applied through the bus 40 to the control means 11.

As was described before, the pattern of each line is generated by one of the first through fourth font memories 71 through 74, and the pattern signal is applied through the bus 40 to a bus buffer 160 in the control means 11. The pattern signal thus applied is supplied from the bus buffer 160 through a bus 161 to a data selector 162, to which a signal is applied through a bus 163 by the dot counter 133. As a result, a laser beam controlling signal corresponding to each dot is applied through a line 164 to a dot controller 165.

A signal from the line counter 138 is applied through a bus 166 to the dot controller 165, and a signal from the column character counter 137 is supplied through a bus 167 to the dot controller 165, so that the laser beam controlling signal is applied through a line 168 to the bus buffer 111 in synchronization with the supplying of the copying sheet 22. Then, the laser beam controlling signal is applied through the line 33 to the modulator 14 in the printer mechanism 3. When one line of one column has been printed in this manner, one line of the following column is printed and then the following line is printed. Therefore, in the control means 11, the values of the address signal and the line signal are successively increased.

Figure 9:
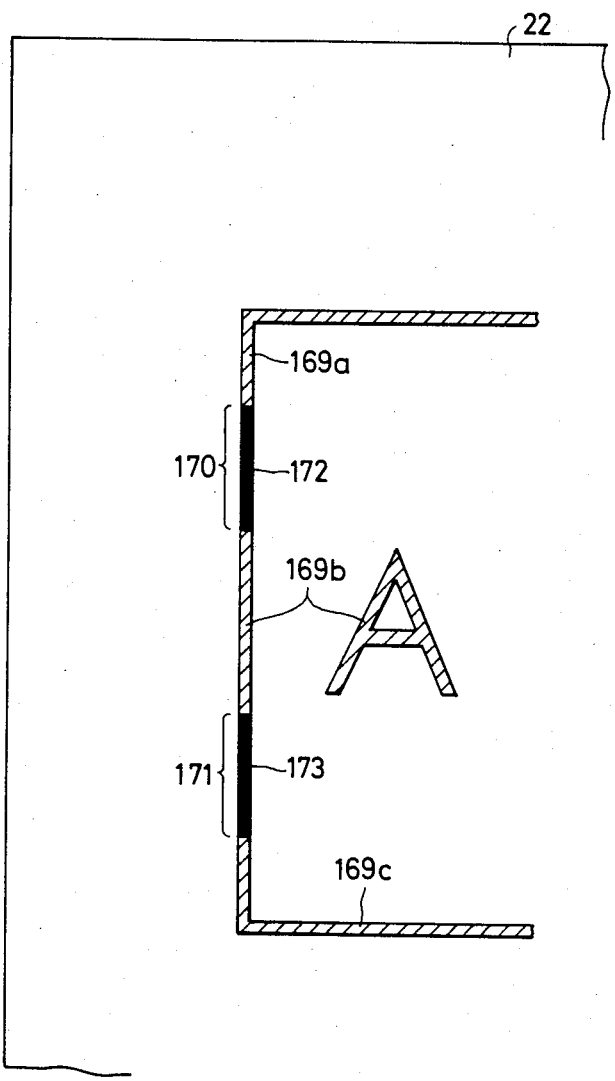
FIG. 9 is a front view of a copying sheet on which image data have been printed.

FIG. 9 is a front view showing a part of a copying sheet 22 on which image data have been printed. Character patterns 169a, 169b and 169c as shaded by oblique lines in FIG. 9 are printed on the copying sheet 22 according to the character patterns in the parts (a), (b) and (c) of FIG. 7, and straight lines 172 and 173 are printed in the spaces 170 and 171 between the lines of the character patterns 169a through 169c as indicated in black.

In the above-described embodiment, the data are stored in the uppermost lines in FIG. 7, namely, the 0-th lines 200, 234 and 237 and the lowermost lines, namely, the 31st lines 231, 235 and 238 in the rows 232, 233 and 236 of the memory regions 117, 121 and 126 in the first through fourth font memories 71 through 74 included in the character-patterning means 9, and the straight lines are printed in the spaces 170 and 171 between the lines of the copying sheet 22. However, in another embodiment of the invention, the data are stored in the uppermost lines in FIG. 7, namely, the 0-th lines 200, 234 and 237 or in the lowermost lines, namely, the 31st lines 231, 235 and 238 in the rows 232, 233 and 236 of the memory regions 117, 121 and 126, and the straight lines are printed in the spaces 170 and 171 between the lines of copying sheet 22.

In the above-described embodiments, the vertical straight lines are printed in the spaces 170 and 171 between the lines of the copying sheet 22. However, in a further embodiment of the invention, spaces are provided between the rows of a copying sheet, so that the data are stored in the rightmost and leftmost dots of each column and the horizontal straight lines are printed in the spaces between the rows of the copying sheet 22.

In the above-described embodiments, image data are printed with an electrostatic copying machine; however, it should be noted that the invention is not limited to printing by an electrostatic copying machine; that is, the technical concept of the invention in applicable to other printers.

As is apparent from the above description in the laser recording apparatus according to the invention, it is unnecessary to increase the capacity of the memory region of the memory means adapted to store character data to be printed, and straight lines can be printed in the spaces between character patterns.

Figure 10A:
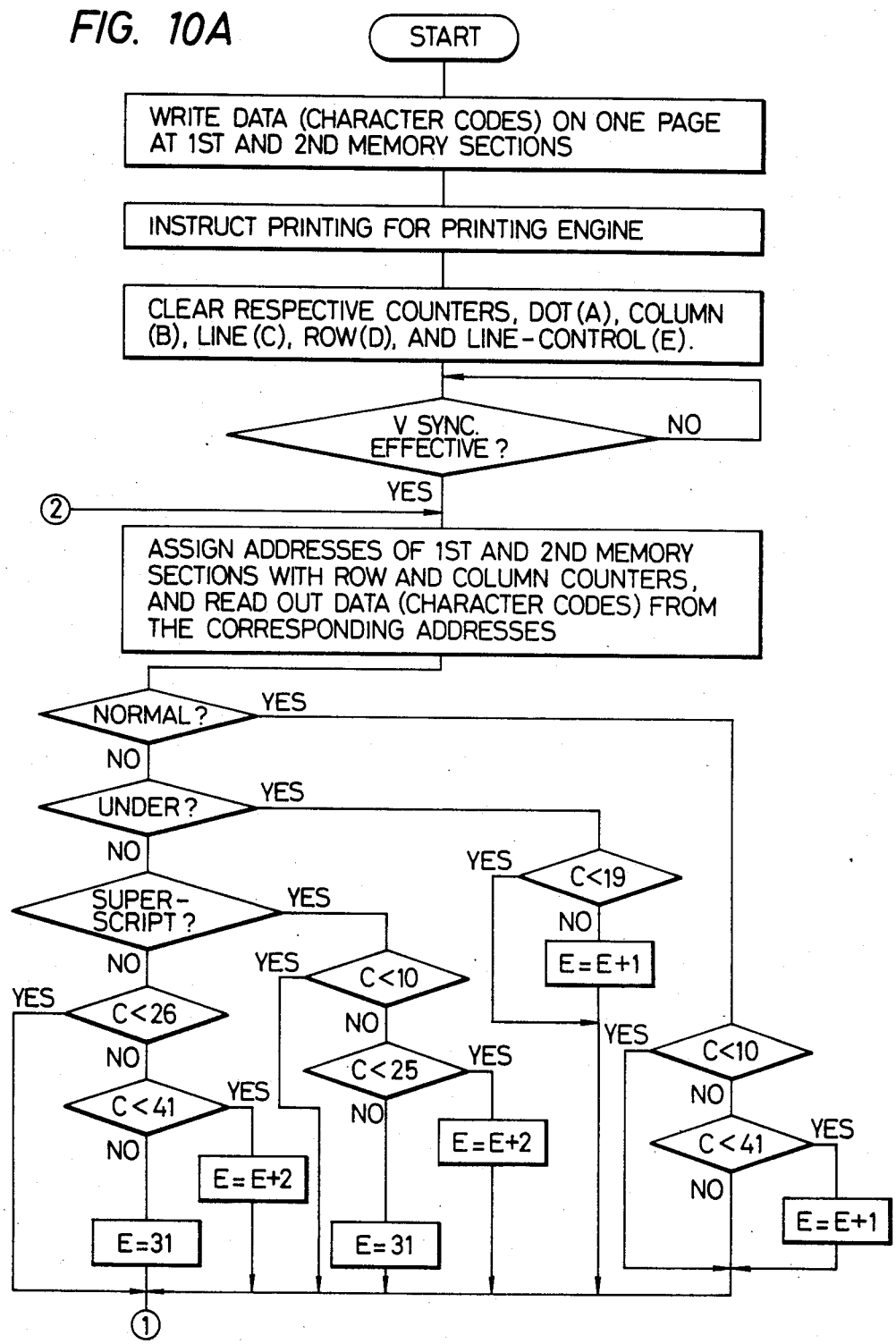
FIGS. 10A and B show a series flow chart for the preferred embodiment.
Figure 10B:
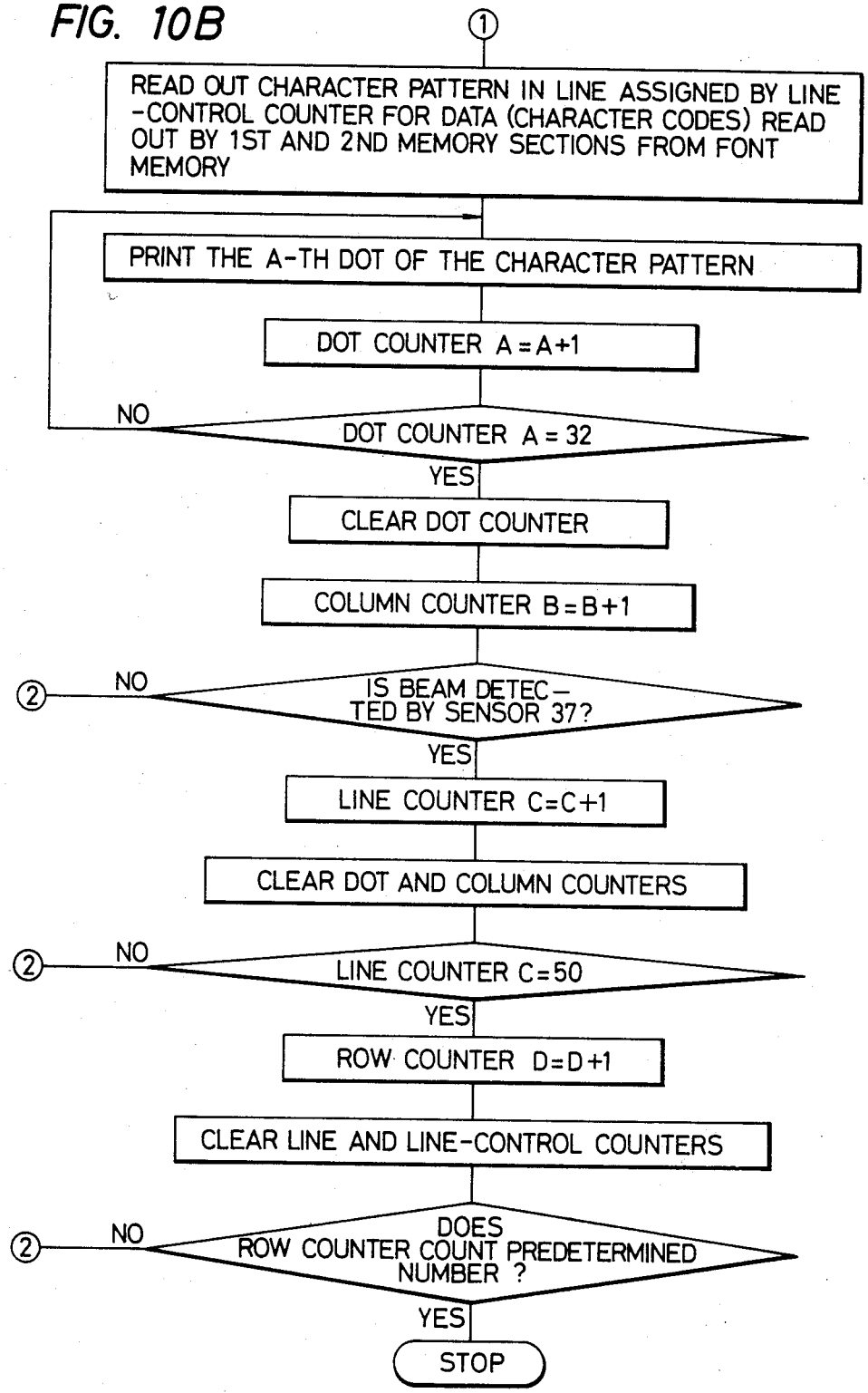

FIGS. 10A and B show a flow chart for the foregoing embodiment for more clearly understanding the invention.

What is claimed is:

1. A laser recording apparatus for printing rows of characters and inter-row lines between said rows of said characters, said apparatus including an image control circuit for driving a printer mechanism to print said characters and said inter-row lines, and said image control circuit comprising:

memory means for storing character data representing said characters to be printed;

character-patterning means coupled to said memory means for converting said stored character data into character pattern signals, said character-patterning means also including memory regions containing character pattern data used in said conversion;

control means coupled to said character-patterning means for causing said character-patterning means to perform said conversion and for outputting signals to said printer mechanism to cause the printing of said rows of characters and of said inter-row lines, said control means including:
   (i) means for reading said character pattern signals from selected portions of said character-patterning memory regions,
   (ii) means for causing said reading means to repeatedly read portions of said character pattern signals to form inter-row line signals, and
   (iii) means for transmitting said character pattern signals and said inter-row line signals to said printing mechanisms; and a central processing unit for controlling said memory means, said character-patterning means, and said control means.

2. The laser recording apparatus of claim 1 wherein said memory regions of the character-patterning means include at least one font memory for storing the configuration of character patterns.

3. The laser recording apparatus of claim 1 wherein said vertical extending means includes a line control counter coupled to said character patterning means for sequencing said character pattern signals and said inter-row line signals.

4. The laser recording apparatus of claim 1 wherein the memory means includes two memory sections which store character data.

5. The laser recording apparatus of claim 1 wherein the control means has horizontal and vertical delay means for determining a print start point for said printing mechanism in horizontal and vertical directions respectively.

6. The laser recording apparatus of claim 3 wherein the control means further includes timing means for controlling said line control counter such that said counter is responsive to stored character data from said memory means and to said timing means to develop a printer output signal to apply to said printing mechanism.

7. A laser recording apparatus for printing rows of characters and inter-row lines between said rows of characters, said apparatus including an image control circuit for driving a printer mechanism to print said characters and lines and said image control circuit comprising:

memory means for storing character data representing said characters to be printed;

character-patterning means coupled to said memory means for converting said stored character data into character pattern signals, said character patterning means also including memory regions containing character pattern data used in said conversion;

control means coupled to said character-patterning means for causing said character-patterning means to perform said conversion and for outputting signals to said printer mechanism to cause the printing of said rows of characters and said inter-row lines, said control means including
   (i) means for reading said character pattern signals from selected portions of said character-patterning memory regions,
   (ii) means for causing said reading means to repeatedly read portions of said character pattern signals to form inter-row line signals, and
   (iii) means for transmitting said character pattern signals and said inter-row line signals to said printing mechanism; and a central processing unit for controlling said memory means, said character-patterning means, and said control means.

8. The laser recording apparatus of claim 6, wherein said control means also includes means for transmitting said inter-row line signals to said character-patterning means and wherein said character-patterning means includes means for using said inter-row line signals to form said character pattern signals.

9. The laser recording apparatus of claim 6, wherein said line counter includes a plurality of counters for aligning the printing of said rows of characters at different locations.

* * * * *